Dec. 31, 1929.                T. D. FINIZIO                 1,741,513
                        BUMPER FOR MOTOR VEHICLES
                 Original Filed May 25, 1927    2 Sheets-Sheet 1
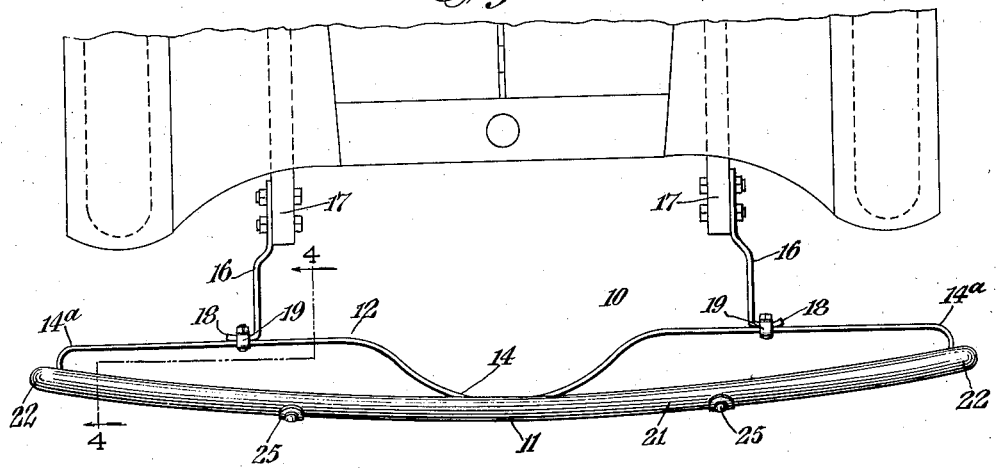
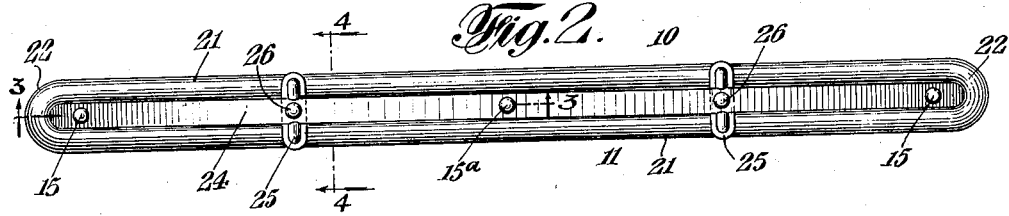
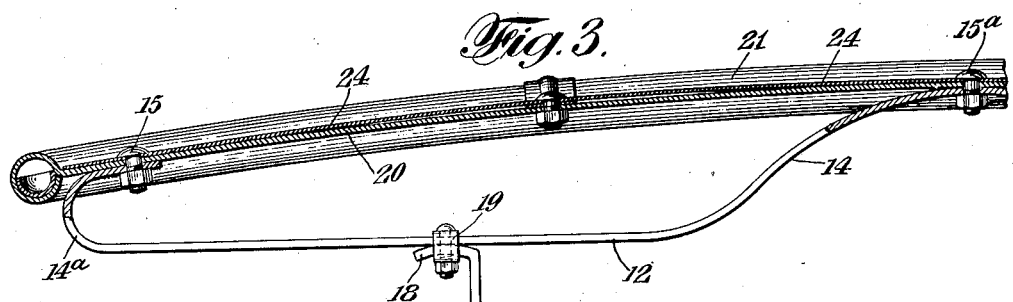
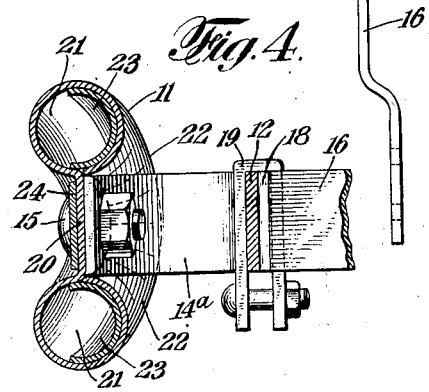
Inventor
Thomas D. Finizio
By Conrad A. Dietrich
his Attorney

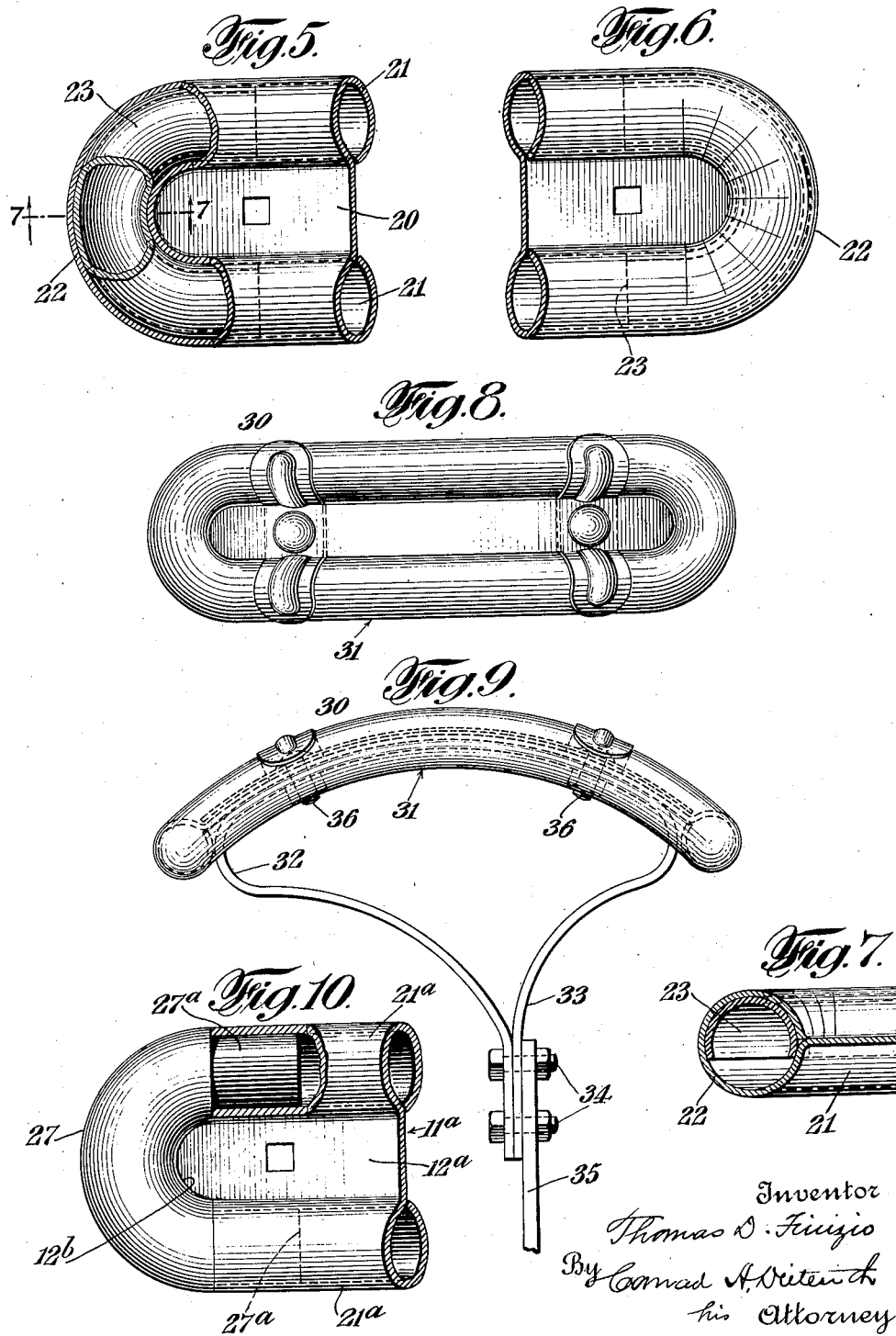

Patented Dec. 31, 1929

1,741,513

UNITED STATES PATENT OFFICE

THOMAS D. FINIZIO, OF PEEKSKILL, NEW YORK

BUMPER FOR MOTOR VEHICLES

Application filed May 25, 1927, Serial No. 193,956. Renewed March 25, 1929.

My invention relates to improvements in means for protecting motor vehicle against damage by collision or contact with other bodies or objects, and the same has for its object more particularly to provide a light, efficient, inexpensive, and durable device which may be readily attached to a vehicle.

Further, said invention has for its object to provide a bumper in which the fender-bar is formed of relatively thin metal, and provided along its peripheral edges with reinforcing means whereby to impart to the bar, as a whole, the required strength and rigidity.

Further, said invention has for its object to provide a bumper in which the fender-bar is formed of a single piece or blank of sheet metal to include a relatively thin longitudinal portion, and a rim portion extending from and entirely enclosing the edges of said longitudinal portion whereby to reinforce the fender-bar as a whole.

Further, said invention has for its object to provide a bumper in which the fender-bar is formed from a single blank of relatively thin sheet metal to include a relatively narrow longitudinal portion, and a tubular edge portion of relatively large diameter extending from an entirely surrounding the edges of said longitudinal portion, and the whole appropriately curved in the direction of the length of the bar whereby to impart to the bar as a whole both longitudinally and transversely the desired degree of strength and rigidity.

Other objects will in part be obvious and in part be pointed out hereinafter.

To the attainment of the aforesaid objects and ends my invention consists in the novel details of construction, and in the combination, connection, and arrangement of parts hereinafter more fully described and then pointed out in the claims.

In the accompanying drawings showing an illustrative embodiment of the invention—

Figure 1 is a plan or top view showing the forward end of a motor vehicle provided with one form of bumper constructed according to, and embodying, my said invention;

Fig. 2 is a front view of the bumper;

Fig. 3 is an enlarged detail longitudinal section on the line 3—3 of Fig. 2;

Fig. 4 is an enlarged detail transverse section on the line 4—4 of Fig. 2;

Fig. 5 is an enlarged detail front view of one end of the fender-bar partly broken away, to show the semi-cylindrical insert over which the inner edge of the rounded end portion of the bar is formed;

Fig. 6 is a similar view showing the rear side of the same end after the same is completed;

Fig. 7 is a transverse section on the line 7—7 of Fig. 5;

Fig. 8 is a front or face view showing the invention embodied in a rear bumper;

Fig. 9 is a plan or top view of the construction illustrated at Fig. 8, and

Fig. 10 is a detail view partly broken away, showing a modified form of end construction.

In said drawings, referring to Figs. 1 to 7, inclusive, 10 designates the bumper, as a whole, comprising a fender-bar 11, and a resilient member 12 in the form of a longitudinal spring having a bowed intermediate portion 14, and rounded ends 14$^a$. The resilient member 12 is secured to the fender-bar 11 at its ends and intermediate portion by bolts and nuts 15, 15$^a$.

16 denotes attaching brackets which are bolted at their rear ends to the forwardly extending portions of the side frame members 17 of the vehicle chassis, and provided at their forward ends with slightly rounded angular end portions 18 embraced by clamps 19, which also engage the resilient member 12, whereby the bumper 10 may be firmly, yet yieldingly secured to said vehicle frame.

The fender-bar 11 is preferably formed by suitable dies or series of dies from a single blank of sheet metal of suitable thickness and comprises a flat longitudinal portion 20 having its peripheral edge bent forwardly and thence rearwardly until it meets the edges of the longitudinal portion 20, to form a tubular rim portion 21 extending entirely around the entire edge of said longitudinal portion 20. In order to impart to the fender-bar as a whole the desired degree of strength and rigidity. the diameter of the tubular rim portions 21 is substantially equal to the height of the longitudinal portion 20, or reversely stated, the parallel longitudinal tubular rim portions 21 are separated from each other throughout their entire length by an intermediate portion 20 equal to the diameter of said tubular rim portion. In order further to insure the due strength and rigidity of the bar, the same is curved longitudinally substantially as shown at Fig. 1.

Before the fender-bar is subjected to the final operations of the dies, the edges of the rounded tubular end portions 22 are split or notched radially, and a half-round, semi-cylindrical insert 23 is then placed in position within the partly formed fender-bar to serve as a mold or form in the final shaping operation, and also to reinforce the inner portions of said rounded ends where the same may have become weakened as a result of said radial cutting operation.

In order to enhance the appearance of the bumper the flat intermediate portion 20 thereof may be provided with a strip 24 of aluminum, and transverse members 25 conformed to the intermediate portion 20, and to the tubular rim portions 21, and the parts then secured together by bolts 26 and the bolts 15, which latter serve to hold the bumper as a whole secured to the attaching brackets 16.

At Figs. 8 and 9 the invention is shown embodied in a rear end bumper 30, for which purpose the device is substantially like the construction illustrated at Figs. 1 to 7, inclusive, except that in this instance the fender-bar 31 is made much shorter, and curved longitudinally to a greater degree than the front bumper, and that in view of the shortness of the fender-bar 31, the yielding support or spring 32 is preferably made of a single piece of metal having its ends 33 secured together and attached by bolts 34 to a supporting bracket 35 extending from the rear end of a side frame member of the vehicle, or, if desired, the ends of the spring 32 may be secured directly to the rear end of such side frame member. The intermediate portion of the spring 33 is bowed and secured to the rear of the fender-bar by suitable bolts 36.

At Fig. 10 is shown a modified form of end construction for the fender-bar 11$^a$ in which said fender-bar comprises a longitudinal portion 12$^a$ having rounded ends 12$^b$ and parallel tubular rim portions 21$^a$ formed along the opposite longitudinal edges of said longitudinal portion 12$^a$, and coextensive in length therewith. 27 denotes separate cylindrical end members which may be made either hollow or solid, as desired. The said end members 27 are preferably semi-circular in form and correspond in diameter with that of said tubular rim portions 21$^a$, and are provided at their ends with reduced portions 27$^a$ corresponding in diameter with the interior diameter of said tubular rim portions 21$^a$ into which said ends are fitted. The ends 27 may be secured to the ends of the tubular rim portions 21$^a$ by brazing, welding, or by suitable or convenient mechanical means.

It is to be noted that by means of my invention I am enabled to produce a fender-bar which is simple in construction, light in weight and durable in service, and that the same is readily available for use in connection with front end as well as rear end bumpers, without regard to the size thereof.

Having thus described my said invention, what I claim and desire to secure by Letters Patent is—

1. A fender-bar formed of sheet metal comprising a flat longitudinal portion, and a hollow, tubular portion along the edges of said longitudinal portion, substantially as specified.

2. A fender-bar formed of sheet metal comprising a flat longitudinal portion and a hollow, tubular portion extending entirely around the edges of said longitudinal portion and integral therewith, substantially as specified.

3. A fender-bar formed of sheet metal comprising a plurality of longitudinal tubular portions, and an intermediate portion uniting said tubular portions longitudinally throughout their length, substantially as specified.

4. A fender-bar formed of sheet metal comprising a flat longitudinal portion, having a peripheral portion of circular outline in cross-section serving to reinforce said bar as a whole, substantially as specified.

5. A fender-bar formed of sheet metal comprising a flat longitudinal portion and a tubular rim extending from said longitudinal portion; and the rim parts arranged at opposite sides of the bar having their centers disposed in a vertical plane coinciding with that of said longitudinal portion, substantially as specified.

6. A fender-bar formed of sheet metal comprising a flat, longitudinal member and a continuous tubular rim portion formed integrally with said member and extending entirely around the edges thereof, and reinforcing means disposed within said tubular rim portion at the opposite ends of said longitudinal member, substantially as specified.

7. A fender-bar formed of sheet metal comprising a flat longitudinal intermediate portion, tubular longitudinal rim portions extending from the opposite longitudinal edges of said intermediate portion, and curved tubular portions extending from the opposite ends of said intermediate portion and merging at their ends with the ends of said longitudinal tubular rim portions, substantially as specified.

8. A bumper for vehicles comprising a fender-bar formed of sheet metal comprising a flat longitudinal intermediate portion and a continuous tubular rim portion formed integrally with said intermediate portion and extending along the entire edges thereof, and a resilient member secured at its ends to said bar intermediate the tubular rim portions thereof, substantially as specified.

9. A bumper for vehicles comprising a fender-bar formed of sheet metal comprising a flat, longitudinal intermediate portion and a continuous tubular rim portion formed integrally with said flat longitudinal intermediate portion and extending along the entire edges thereof, a resilient member arranged in spaced relation to said fender-bar and secured at its ends and at a point intermediate its ends to said fender-bar intermediate the longitudinal tubular rim portions thereof, substantially as specified.

10. A fender-bar formed of sheet metal comprising a longitudinal intermediate portion, tubular longitudinal rim portions extending from the opposite longitudinal edges of said intermediate portion, rounded tubular end portions extending from the opposite ends of said bar and merging at their ends with the ends of said longitudinal tubular rim portions, and reinforcing members disposed within said rounded end portions and conforming thereto, substantially as specified.

11. A fender-bar formed of sheet metal comprising a substantially flat longitudinal portion, and transversely curved rim portions along the opposite edges of said longitudinal portion, substantially as specified.

12. A fender-bar formed of sheet metal comprising a substantially flat longitudinal portion, and transversely curved rim portions extending entirely around the edges of said longitudinal portion, substantially as specified.

13. A fender-bar formed of sheet metal comprising a substantially flat longitudinal portion, and transversely curved rim portions extending entirely around the edges of said longitudinal portion and integral therewith, substantially as specified.

14. A fender-bar formed of sheet metal comprising a substantially flat portion, and a plurality of transversely curved rim portions; said flat portion serving to unite said curved rim portions longitudinally throughout their length, substantially as specified.

15. A fender-bar formed of sheet metal comprising a substantially flat longitudinal intermediate portion, and transversely curved rim portions extending from said intermediate portion having portions thereof disposed in a vertical plane parallel to, and in front of the plane of said intermediate portion, substantially as specified.

16. A fender-bar formed of sheet metal comprising a relatively-narrow longitudinal intermediate portion, and rim portions along opposite longitudinal edges of said intermediate portion, and integral therewith; said rim portions having parts arranged in different planes parallel with said intermediate part, substantially as specified.

17. A fender-bar formed of sheet metal comprising a relatively-narrow longitudinal intermediate portion, and rim portions along the opposite longitudinal edges of said intermediate portion and integral therewith; said rim portions having a transverse depth greater than the thickness of said intermediate portion and serving to reinforce the bar as a whole, substantially as specified.

Signed at New York, in the county of New York, and State of New York, this 13th day of April, one thousand nine hundred and twenty-seven.

THOMAS D. FINIZIO.